(12) United States Patent
Cretegny et al.

(10) Patent No.: US 8,342,386 B2
(45) Date of Patent: Jan. 1, 2013

(54) BRAZE MATERIALS AND PROCESSES THEREFOR

(75) Inventors: Laurent Cretegny, Niskayuna, NY (US); Sundar Amancherla, Karnataka (IN); Jeffrey Jon Schoonover, Niskayuna, NY (US); Balasubramaniam Vaidhyanathan, Leicestershire (GB)

(73) Assignee: General Electric Company, Niskayuna, NY (US)

( * ) Notice: Subject to any disclaimer, the term of this patent is extended or adjusted under 35 U.S.C. 154(b) by 251 days.

(21) Appl. No.: 12/236,788

(22) Filed: Sep. 24, 2008

(65) Prior Publication Data

US 2009/0014505 A1 Jan. 15, 2009

Related U.S. Application Data

(63) Continuation-in-part of application No. 11/611,297, filed on Dec. 15, 2006.

(51) Int. Cl.
*B23K 31/00* (2006.01)

(52) U.S. Cl. ............... 228/248.1; 228/246; 228/256; 428/553; 428/564

(58) Field of Classification Search ............. 228/256, 228/248.1, 246; 428/553, 564
See application file for complete search history.

(56) References Cited

U.S. PATENT DOCUMENTS

| | | | | |
|---|---|---|---|---|
| 3,469,967 A | * | 9/1969 | Meddings et al. | 75/232 |
| 3,846,084 A | * | 11/1974 | Pelton | 428/565 |
| 3,852,078 A | * | 12/1974 | Wakatsuki et al. | 501/92 |
| 5,194,408 A | | 3/1993 | Stamp et al. | |
| 5,560,754 A | * | 10/1996 | Johnson et al. | 51/297 |
| 6,054,693 A | | 4/2000 | Barmatz et al. | |
| 6,210,812 B1 | * | 4/2001 | Hasz et al. | 428/621 |
| 6,436,470 B1 | * | 8/2002 | Iacocca et al. | 427/201 |
| 6,512,216 B2 | | 1/2003 | Gedevanishvili et al. | |
| 7,326,892 B1 | | 2/2008 | Cretegny et al. | |
| 7,354,659 B2 | | 4/2008 | Duckham et al. | |
| 2003/0207142 A1 | * | 11/2003 | Giesler et al. | 428/564 |
| 2006/0071053 A1 | | 4/2006 | Garimella | |
| 2006/0201935 A1 | | 9/2006 | Nishikawa | |
| 2008/0083748 A1 | | 4/2008 | Thyssen et al. | |
| 2008/0138533 A1 | | 6/2008 | Borneman et al. | |
| 2008/0141825 A1 | | 6/2008 | Thyssen et al. | |
| 2008/0142575 A1 | | 6/2008 | Cretegny | |
| 2008/0145566 A1 | | 6/2008 | Cretegny et al. | |

* cited by examiner

*Primary Examiner* — Nicholas D'Aniello
(74) *Attorney, Agent, or Firm* — John P. Darling

(57) ABSTRACT

Braze materials and processes for using braze materials, such as for use in the manufacturing, coating, repair, and build-up of superalloy components. The braze material contains a plurality of first particles of a metallic material having a melting point, and a plurality of second particles comprising at least one nonmetallic material chosen from the group consisting of oxides, carbides, and nitrides of at least one metal. The nonmetallic material is more susceptible to heating by microwave radiation than the metallic material of the first particles, and the nonmetallic material is present in the braze material in an amount sufficient to enable the first particles to completely melt when the first and second particles are subjected to heating by microwave radiation.

13 Claims, 2 Drawing Sheets

BRAZE MATERIALS AND PROCESSES THEREFOR

CROSS REFERENCE TO RELATED APPLICATIONS

This is a continuation-in-part patent application of co-pending U.S. patent application Ser. No. 11/611,297 and is related to co-pending U.S. patent application Ser. Nos. 11/611,259 and 11/611,326, each filed Dec. 15, 2006. The contents of these prior applications are incorporated herein by reference.

BACKGROUND OF THE INVENTION

This invention generally relates to braze materials and processes for making and using braze materials, such as for use in the manufacturing, coating, repair, and build-up of superalloy components. More particularly, this invention relates to braze material powders containing melt-modifying constituents, and to processes for producing and using such powders.

Nickel, cobalt, and iron-base superalloys are widely used to form high temperature components of gas turbine engines. While some high-temperature superalloy components can be formed as a single casting, others are preferably or necessarily fabricated by other processes. As an example, brazing can be used to fabricate certain gas turbine components, such as high pressure turbine nozzle assemblies. Brazing is also used to repair cracks and other surface flaws and damage, build up surfaces to restore desired dimensions, and form protective coatings on gas turbine engine components. Brazing techniques of these types encompass heating a braze material, typically in the form of a braze alloy powder, a paste or tape containing a braze alloy powder, or a sintered preform of a braze alloy powder, to a temperature above the melting point of the braze alloy, but sufficiently below the melting point of the material being brazed to avoid damaging and/or reducing desired properties of the material. (As used herein, "melting point" is meant to encompass the incipient melting point for alloys that do not have a true melting point but instead have a melting range.) For example, brazing temperatures are typically limited to avoid grain growth, incipient melting, recrystallization, and/or unfavorable phase formation in the alloy or alloys being brazed.

In situations where a brazement must have a composition and properties similar to the substrate being brazed, the braze alloy will typically have a composition essentially or nearly the same as the substrate, but modified to contain one or more melting point suppressants, such as boron and/or silicon, which form low melting eutectics with the substrate material. In the past, braze alloy powders have been prepared by combining their alloying constituents through such processes as atomization and mechanical alloying to yield a powder whose particles have a uniform composition. For example, EPO456481 reports a process in which a titanium-based braze alloy powder is formed by mechanically alloying powders of each elemental constituent of the braze alloy, including powders of nickel and/or copper as the melting point depressant(s), to create a presumably uniform distribution of the elements in the braze alloy powder.

A difficulty encountered when brazing certain alloys is the tendency for some melting point depressants to form embrittling phases, such as chromium borides that form when brazing chromium-containing superalloys. As a result, brazing is not an appropriate manufacturing or repair process for some applications, particularly many components in the hot gas path of a gas turbine engine. In any case, the amounts of melting point depressants contained in a braze alloy are intentionally limited and sometimes partitioned to minimize their detrimental effects. An example of the latter is the use of a braze alloy system comprising two braze powders, one containing one or more melting point depressants and the other nominally having the same composition as the component being brazed. The higher-melting powder acts as a sink for the excess melting point depressants in the lower-melting powder during and after the brazement is formed. However, segregation of the two powders can occur during the brazing process, with the lower-melting powder taking most of the working volume of the brazement and displacing the higher-melting powder. If this occurs, an excess of melting point depressants will be present in the brazement, which in turn affects the mechanical properties of the brazement.

Microwave brazing is currently been investigated as a potential candidate for eliminating issues associated with conventional brazing techniques, as microwave heating has the potential for localizing heat in selected areas of a component. Two approaches have generally been proposed for microwave brazing. A first entails the use of a susceptor (e.g., SiC enclosure) that is heated when exposed to microwave energy and, in turn, transfers the heat to the component by radiation. Drawbacks to this approach are lack of local heating of the braze alloy only, as an entire region of the component is inevitably heated, and significant heat loss from radiation in directions away from the intended brazement. A second approach entails direct microwave heating of a braze alloy powder, which is more susceptible to absorbing microwave energy than bulk metals, which reflect microwaves. Because typical braze alloy compositions do not couple sufficiently with microwave energy to be fully melted during a microwave treatment, braze powders have been proposed that contain particles that are sufficiently small to be highly susceptible to microwave radiation. This approach is disclosed in commonly-assigned U.S. patent application Ser. Nos. 11/564,898, 11/609,473, and 11/469,567. Another approach is to produce a braze powder containing one or more microwave coupling enhancers that are more highly susceptible to microwave radiation than the base alloy composition of the braze powder. For example, commonly-assigned U.S. Pat. No. 7,326,892 to Cretegny et al. discloses the addition to a braze alloy powder of materials capable of behaving as microwave coupling enhancers, such as silicon, germanium, gallium, cobalt, iron, zinc, titanium, carbon (e.g., carbon nano-tubes or fine graphite powder), aluminum, tantalum, niobium, rhenium, hafnium, molybdenum, and silicon carbide (SiC). Powders of the microwave coupling enhancers can be intermixed with a powder of the braze alloy, or the braze alloy can be alloyed to contain one or more microwave coupling enhancers.

Even with the above advancements, there is an ongoing need to further develop braze powders that can be heated by microwave radiation. In particular, it would be desirable if a braze alloy powder contained one or more microwave coupling enhancers in a form that has minimal negative impact on the mechanical properties of the resulting brazement, and allows for broader use of brazing processes and technology, especially in the manufacture and repair of gas turbine engine components.

BRIEF DESCRIPTION OF THE INVENTION

The present invention generally provides braze materials and processes for using braze materials, such as for use in the manufacturing, coating, repair, and build-up of superalloy components. More particularly, the invention provides and makes use of braze materials containing metallic particles and nonmetallic particles that promote heating and melting of the metallic particles when the braze material is subjected to microwave radiation.

According to one aspect of the invention, a braze material is provided that contains a plurality of first particles of a metallic material having a melting point, and a plurality of second particles comprising at least one nonmetallic material chosen from the group consisting of oxides, carbides, and nitrides of at least one metal. The nonmetallic material is more susceptible to heating by microwave radiation than the metallic material of the first particles, and the nonmetallic material is present in the braze material in an amount sufficient to enable the first particles to completely melt when the first and second particles are subjected to heating by microwave radiation.

According to another aspect of the invention, a process is provided for using such a braze material. The process generally entails applying the braze material to at least a first substrate surface, heating the braze material with microwave radiation to sufficiently heat at least the second particles to cause the first particles to completely melt, and then allowing the molten first particles to cool, solidify, and form a solid brazement. The solid brazement may contain a dispersion of the second particles, or a dispersion of the nonmetallic material. Furthermore, the solid brazement may be, for example, a coating on the first substrate surface, or a braze joint that metallurgically bonds the first substrate surface to a second substrate surface.

From the above, it can be appreciated that the present invention has the ability to significantly promote heating and melting of particles by microwave radiation that may not otherwise be sufficiently susceptible to microwave heating, or otherwise cannot be completely melted by microwave heating. Furthermore, the invention can be applied to various processes in which heating and melting of a metallic powder material is desired, for example, to form a coating on a surface, repair or build-up a surface, or metallurgically join components by brazing. The nonmetallic material of the second particles preferably do not significantly degrade, and in some cases may promote, the mechanical properties desired for the brazement. Furthermore, the nonmetallic material preferably does not dissolve during the brazing operation, and therefore does not degrade the mechanical properties of the substrate or substrates brazed with the braze material.

In view of these benefits, the present invention is particularly advantageous for use in coating, joining, and crack-filling (repairing) of superalloy components, including those found in the hot gas path of gas turbine engines. The invention is believed to be useful in joining, coating, and repair applications in which limited flow of a braze material is required, though the invention is also applicable to crack repairs and other procedures in which a braze material must readily flow over a large surface area before solidifying.

Other objects and advantages of this invention will be better appreciated from the following detailed description.

DETAILED DESCRIPTION OF THE INVENTION

The invention will be described with reference to processing of components for gas turbine engines, and particularly the fabrication, coating, buildup, and repair of such components with a braze material. However, the invention has application to a variety of components, materials, and processes other than those discussed, and such variations are within the scope of this invention.

Figure 1:
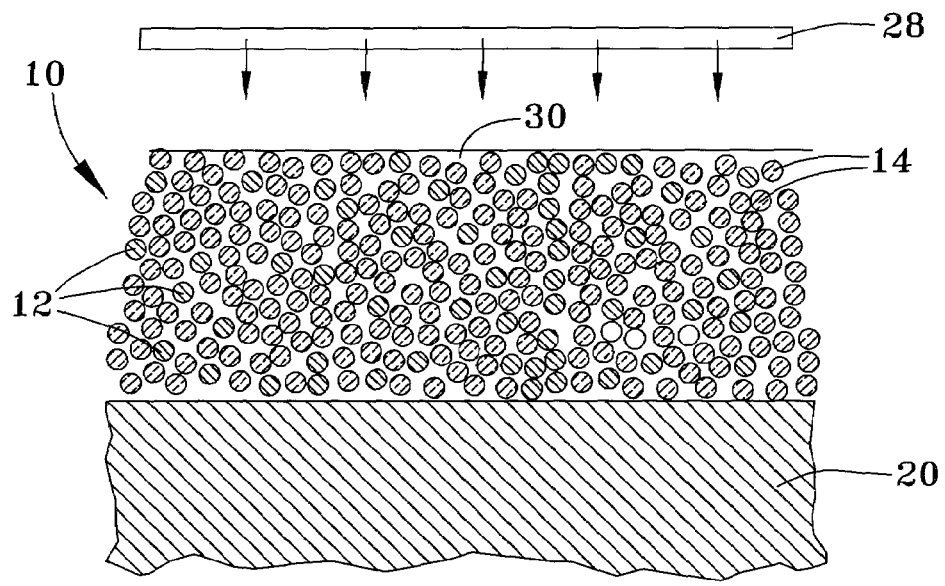
FIG. 1 schematically represents a braze material applied to a surface of a substrate to form a coating on the surface, wherein the braze material contains braze alloy particles and particles of a material that is more susceptible to microwave heating in accordance with an embodiment of the present invention.
Figure 2:
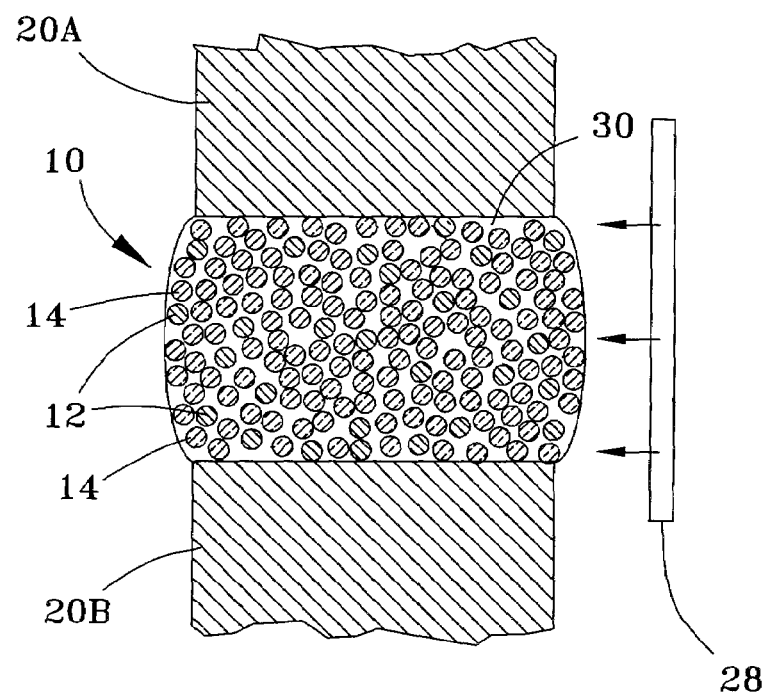
FIG. 2 schematically represents a braze material similar to that of FIG. 1, but placed between a pair of substrates for the purpose of metallurgically joining the substrates in accordance with another embodiment of the present invention.
Figure 3:
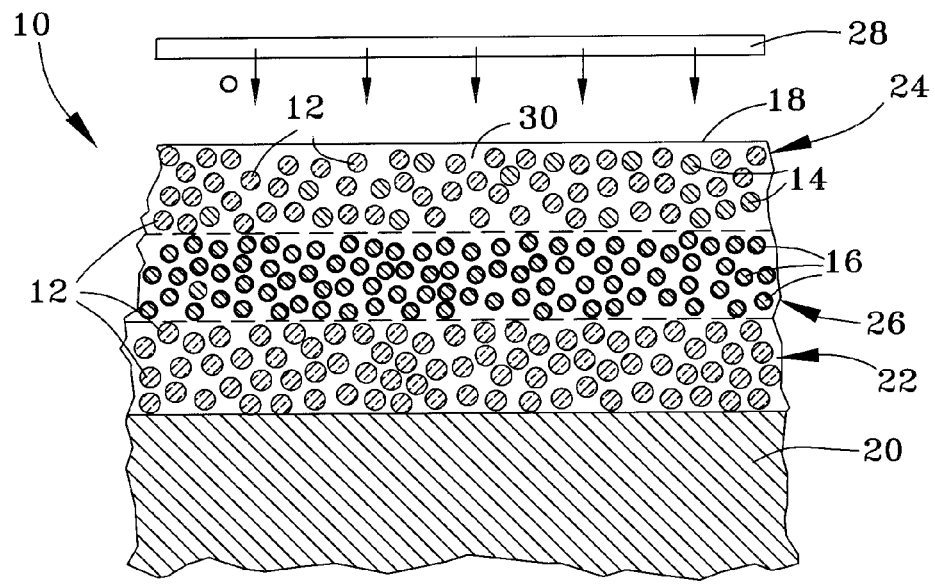
FIG. 3 schematically represents a braze material applied to a surface of a substrate to form a coating on the surface, wherein the braze material is applied in layers and some of the layers contain particles formed of and/or contain a material that is more susceptible to microwave heating in accordance with an embodiment of the present invention.
Figure 4:
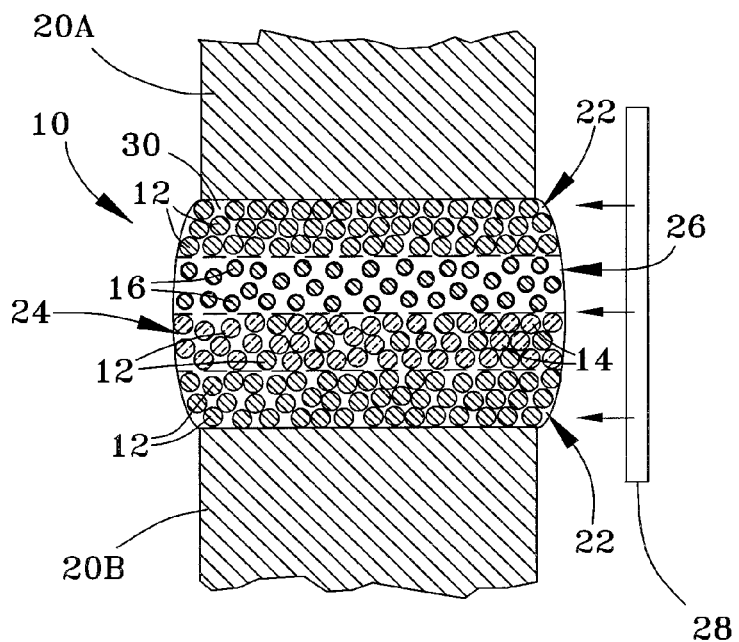
FIG. 4 schematically represents a layered braze material similar to that of FIG. 3, but placed between a pair of substrates for the purpose of metallurgically joining the substrates in accordance with another embodiment of the present invention.

FIGS. 1 through 4 depict embodiments of this invention in which consistent reference numbers are used to identify functionally similar features. FIGS. 1 and 3 schematically represent a braze material 10 on a surface of a substrate 20 for the purpose of repairing, building-up or forming a coating on the substrate 20, and FIGS. 2 and 4 schematically represent a braze material 10 between and contacting opposing surfaces of two substrates 20A and 20B to be metallurgically joined by the braze material 10. In FIGS. 1 and 2, the braze material 10 is represented as containing particles 12 preferably formed entirely of a metallic material and particles 14 preferably formed entirely of a nonmetallic material. In FIGS. 3 and 4, the braze material 10 is represented as being applied in layers 22, 24 and 26. The layer 22 contacting each substrate 20, 20A and 20B is depicted in FIGS. 3 and 4 as containing only the metallic particles 12, whereas another layer 24 contains both metallic and nonmetallic particles 12 and 14, and the remaining layer 26 only contains particles 16 having a nonmetallic material on their surfaces. The nonmetallic material of the particles 16 may be the same or different from that of the nonmetallic particles 14, and the core of the particles 16 may be a metallic material that may be the same or different from that of the metallic particles 12.

The particles 12, 14 and 16 are shown in FIGS. 1 through 4 as being within an optional binder 30 that, according to known brazing practices with braze pastes, burns off during the brazing process, which is preferably performed in an inert or low pressure atmosphere to minimize oxidation of the metallic particles 12 and the surfaces (e.g., substrates 20 and 20A-B) to which the particles 12 become bonded during a brazing cycle. The binder 30 can be selected so that the braze material 10 is in the form of a paste or tape to facilitate application of the braze material 10 to the surface or surfaces of the substrates 20 and 20A-B. Alternatively, the braze material 10 could be formed by sintering the particles 12, 14 and/or 16, yielding a sintered preform.

In combination, the substrates 20A-B of FIGS. 2 and 4 represent surface regions of two components intended to be joined together by brazing, whereas the substrates 20 of FIGS. 1 and 3 may be surface regions of gas turbine engine components to be coated, built-up, or repaired by brazing. The substrates 20 and 20A-B may be formed of superalloys, whose compositions will depend on the particular type of component and its anticipated operating conditions. Various other metallic and nonmetallic materials are also possible for the substrates 20 and 20A-B, and therefore within the scope of the invention.

The metallic particles 12 can be formed of a variety of materials, limited only by the requirement that their composition (or compositions) should be compatible with the material of the substrates 20, 20A, or 20B that it contacts while at the maximum heating temperature required to form a repair or coating (FIGS. 1 and 3) or braze joint (FIGS. 2 and 4) with the braze material 10. Compatibility is assured if the particles 12 have the very same composition as that of its substrate 20 or 20A-B, though suitable compatibility can also be achieved if the particles 12 and substrates 20/20A-B do not have compositions prone to detrimental interdiffusion at elevated temperatures that would lead to loss of desired mechanical or environmental properties. The metallic particles 12 may be a conventional braze alloy that contains significant amounts of one or more melting point depressants (such as boron or silicon), a superalloy such as of the type used in turbine applications, or an alloy whose base composition is a superalloy modified to contain limited additions of one or more melting point suppressants. As such, the particles 12 may contain one or more melting point suppressants, though preferably not at levels that would lead to an unacceptable loss of properties in the substrates 20 and 20A-B if a significant amount of the suppressant was to diffuse into the substrates 20 and 20A-B during heating of the particles 12 and later during the life of the substrates 20 and 20A-B. A significant advantage of the invention is that the metallic particles 12 may have the very same superalloy composition (and therefore also the same melting temperature) as the substrate(s) 20/20A-B being brazed. Therefore, the term "brazing" as used herein is not limited to the conventional limitation of an operation performed at a temperature below the melting point of the metal being brazed. Moreover, from the following discussion it will become apparent that a preferred aspect of the invention is the ability to selectively heat the powder particles 12, 14 and 16 and not the surrounding bulk substrates 20 and 20A-B. As a result, particles 12 having the same composition as the substrates 20/20A-B can be melted, while leaving the bulk material of the substrates 20/20A-B unaffected.

According to a preferred aspect of the invention, the nonmetallic material that forms the particles 14 and is present on the particles 16 is a microwave-susceptible material that enables the particles 14 and 16 to promote heating and melting of the particles 12 when the braze material 10 is subjected to microwave radiation 28. As evident from FIGS. 1 and 2, one option is to form the entire braze material 10 as a uniform mixture of the metallic particles 12 and microwave-susceptible nonmetallic particles 14. Another option shown in FIGS. 3 and 4 is to segregate the particles 14 and/or 16 into layers 24 and 26 that, along with the layer 22 containing only the metallic particles 12, make up the braze material 10. It should be understood that in FIGS. 3 and 4, the layer 24 containing the mixture of metallic particles 12 and nonmetallic particles 14 could be limited to contain only the particles 12 or the particles 14. Likewise, the layer 26 containing the particles 16 could further contain metallic particles 12 or nonmetallic particles 14. In addition, the layer 22 containing only metallic particles 12 could be modified to contain either or both types of particles 14 and 16. Finally, each of these options can be used in further combination with a technique for accelerating and enhancing coupling between the microwave radiation 28 and the metallic particles 12 by appropriately sizing and distributing the particles 12 in various mixing and/or layering techniques, as disclosed in related U.S. patent application Ser. No. 11/469,567. In each case, the particles 14 and 16 serve within the braze material 10 as in situ microwave couplants or susceptors that preferentially absorb microwave energy. The absorbed heat is then spread by thermal conduction to the surrounding particles 12, which are also partially heated by direct exposure to the microwave radiation 28, causing them to completely melt and form the desired brazement.

Generally speaking, two heating mechanisms take place during exposure to a microwave field. Because microwave radiation has varying electric and magnetic fields, direct electric heating can be significant in certain nonconductive materials, whereas conductive materials are primarily heated through electromagnetic effects. More particularly, the heating mechanism in metallic materials (for example, particles 12) and other conductive materials is due to eddy current losses, and coupling with the microwave radiation 28 is generally the result of the particles 12 being sufficiently conductive to generate eddy currents induced by the magnetic field of the microwave radiation 28 and/or possessing a level of electrical resistivity capable of generating joule heating from the eddy currents. For nonconductive materials (for example, particles 14 and the surfaces of particles 16) and other dielectric materials, the heating mechanism is due to dielectric losses (the rate of transformation of electric energy into heat for a dielectric material subjected to a changing electric field) that cause heating through dipole rotation. It is known that the magnetic loss component of susceptibility for a material in very fine powder size is dependent on factors such as microwave power and frequency. Conversely it is believed that, for a given microwave power and frequency, the interaction between microwave energy and a particular material will be optimum at a distinct particle size for conventional microwave conditions (about 2.45 GHz and about 1 to about 10 kW power). Particle sizes above or below the optimum particle size will not couple as well with microwave radiation. Consequently, suitable and preferred maximum sizes for the particles 14 and 16 will depend on the particular application, temperatures, and materials involved. Generally speaking, it is believed that a maximum particle size is on the order of about 140 mesh (about 100 micrometers), more preferably 325 mesh (about 44 micrometers) and smaller. Minimum particle sizes can be as little as nanoscale, e.g., less than 100 nanometers. Similarly, suitable and preferred maximum sizes for the metallic particles 12 will depend on the particular application, temperatures, and materials involved. Because the goal is for the metallic particles 12 to completely melt, the size of the particles 12 should be limited. A maximum particle size is believed to be on the order of about 140 mesh (about 100 micrometers), more preferably about 2 to about 25 micrometers, and most preferably about 11 micrometers. The preferred and most preferred particle sizes are based on modeling studies performed during the investigation of this invention using a 2.45 GHz microwave field. In the investigation, heat generation was shown to be a variable of particle size, and the optimum particle size was in a range of about 2 to about 25 micrometers, with peak heat generation occurring at about 11 micrometers for packing densities of between 50% and 88%.

Previous microwave-susceptible materials proposed for use in braze materials have been typically limited to metals and metal alloys capable of dissolving in the alloy of the metallic particles 12 when molten to minimize the formation of discontinuities in the resulting brazement (coating, repair or braze joint) that could adversely affect its mechanical properties. However, metals and their alloys tend to reflect microwaves and inefficiently heat when subjected to microwave radiation. Furthermore, microwaves only penetrate metals in a skin layer of generally less than one micrometer thickness. Microwave heating of a particle does not take place to any significant degree unless the volume of the skin layer of the particle becomes non-negligible compared to the entire volume of the particle, which generally applies to powder particle sizes of about 150 micrometers and less. Even so, sufficient heating to completely melt a metal particle by microwave radiation is difficult to achieve. In the present invention, preferred microwave-susceptible materials for the particles 14 and 16 are oxides, nitrides, and carbides, including oxides, nitrides, and carbides of metals in the alloys of the particles 12 and 16 and the alloys of the substrates 20 and 20A-B. Such microwave-susceptible materials are generally ceramics that include, but are not limited to, oxides, carbides, and nitrides of manganese, nickel, copper, tungsten, tantalum, chromium, and iron. Of these, nickel oxide (NiO) and manganese dioxide ($MnO_2$), are believed to be preferred. The particles 14 are preferably formed entirely of one or more of these microwave-susceptible materials. In contrast, the microwave-susceptible materials are generally limited to the surfaces of the particles 16, and substantially absent from the core region of each particle 16. The microwave-susceptible materials can be produced on the surfaces of the particles 16 by, for example, oxidation, nitriding or carburizing the base metal alloy of the particles 16, with the result that the microwave-susceptible material is formed in situ as an oxide, carbide, or nitride of the base metal alloy of the particles 16. In this case, the core of the particles 16 may be the same composition as the particles 12, or another metallic material that can be beneficial to the brazement produced with the braze material 10.

The microwave-susceptible materials of the particles 14 and 16 are particularly practical if present in limited amounts and either become uniformly distributed as a dispersion throughout the resulting brazement, or segregate to a surface region 18 of the brazement where any detrimental affect is minimized. For example, in FIG. 3 the layer 22 containing only the metallic particles 12 contacts the substrate 20, the greatest amount of microwave-susceptible material is in the layer 24 that will define the outer surface 18 of the brazement, and the middle layer 26 contains an intermediate amount of the microwave-susceptible material as a result of the microwave-susceptible material being limited to the surfaces of the particles 16. In FIG. 4 the layers 22 containing only the metallic particles 12 contact the substrates 20A and 20B, and the microwave-susceptible material is largely limited to the layers 24 and 26. High-susceptibility materials contemplated by the present invention can be added in amounts of, by weight, up to about 50% and more preferably about 20 to about 40% of the total weight of particles 12 and 14 and/or 16 in the braze material 10 or in any given layer 24 or 26 of the braze material 10.

Microwave radiation is preferably applied to the braze material 10 in a multi-mode cavity, which as known in the art provides for a microwave field that does not establish a standing wave, but instead provides a uniform amplitude of both its magnetic and electric components. Alternatively, a single-mode cavity can be used, in which case a standing or traveling wave is propagated, enabling imposition, to a certain extent, the relative amplitudes of the electric and magnetic components of the microwave field. A wide range of microwave frequencies could be used with the present invention, though regulations generally encourage or limit implementation of the invention to typically available frequencies, e.g., 2.45 GHz and 915 MHz, with the former believed to be preferred. However, it should be understood that other frequencies are technically capable of use. A benefit of using a lower frequency is the greater associated wavelength, which may be better suited for higher power transmission or processing of larger components. Suitable microwave power levels will depend on the size and composition of the particles 12, 14 and 16, but are generally believed to be in a range of about 1 to about 10 kW, though lesser and greater power levels are also foreseeable.

To further improve the particle-microwave interaction, the substrates 20 and 20A-B can be preheated prior to microwave brazing to enhance the susceptibility of the metallic particles 12 to microwave heating and thereby facilitate their melting. Preheating can be performed by any suitable means, such as with conventional radiative or inductive methods, with the use of a susceptor (e.g., SiC) media that will heat to very high temperatures when exposed to microwave radiation, or with a microwave-induced plasma as described in U.S. Pat. No. 6,870,124. Depending on the material used as the particles 12, a minimum preheat temperature is believed to be about 250° C., more preferably about 400° C., in order to have a significant impact on particle-microwave interaction, with maximum temperatures limited by the desire to avoid any microstructural change in the substrates 20 and 20A-B.

According to an optional aspect of the invention, the efficiency with which electromagnetic (e.g., microwave) energy can be converted to heat by the particles 12, 14 and/or 16 can be increased by subjecting the particles 12, 14 and/or 16 to a thermal pretreatment prior to brazing, such as by exposing the particles 12, 14 and/or 16 to a microwave field while at an elevated temperature, or simply by heating using any conventional heating technique. This technique is based on certain elements experiencing an irreversible increase in their microwave coupling behavior when exposed to sufficiently elevated temperatures, as reported in commonly-assigned U.S. Pat. No. 7,326,892.

In view of the foregoing, the present invention makes possible the brazing of superalloy substrates with alloys having the very same composition as the substrate, as well as alloys with the same or even higher melting point as the substrate. For example, a nickel-base superalloy component can be joined or repaired with a braze material 10 containing particles 12 formed of the same nickel-base superalloy composition or another nickel-base alloy, in other words, an alloy whose base metal is the same as the base metal of the substrate. Furthermore, carbides, nitrides and oxides are found in metal alloys, such as strengthening phases in composite materials. Because carbides, nitrides and oxides do not dissolve during brazing, the particles 14 or the material on the surfaces of the particles 16 will likely remain as a dispersion within a brazement formed by the braze material, and degradation of the properties of the substrate 20 or 20A-B resulting from interdiffusion with the braze material 10 can be essentially if not entirely avoided.

In an investigation leading to the present invention, powders of oxides of manganese, nickel, copper, tungsten, tantalum, chromium, and iron, carbides of chromium and silicon, and nitrides of chromium and silicon were prepared, mixed with a Ni-19Cr-10Si (nominal by weight) powder, and then heated by microwave radiation. All powders were sieved to −325 mesh (less than about 45 micrometers). Approximately eight grams of each ceramic powder was mixed with about twenty grams of the metal alloy powder, placed in a multi-mode microwave cavity, and then subjected to heating with microwave radiation at frequency and power levels of about 2.45 GHz and about 6 kW, respectively, for a duration of about ten minutes. As a baseline, comparable amounts of the metal alloy powders were also subjected to heating under the same conditions. Compared to the metal alloy powder, the powder mixtures containing NiO, $MnO_2$, $Cr_3C_2$, $Cr_2N$, SiC, and $Si_3N_4$ were heated to a higher temperature under the same experimental conditions, with the best results being obtained with the powders containing NiO and $MnO_2$. Powders of chromium and silicon carbides and nitrides did not perform as well, yet performed better than the baseline metal alloy powder alone.

In another investigation, a braze powder of a Ni-19Cr-10Si (nominal by weight) having a particle size of about −325 mesh underwent oxidation at about 600° C. in air for about twenty-four hours, which resulted in the formation of an approximately one micrometer-thick chromium oxide layer as determined via Auger analysis. The oxidized particles were then mixed with a −325 mesh $MnO_2$ powder, which constituted about 40% by weight of the powder mixture. The powder mixture underwent the same microwave treatment as in the preceding investigation, during which melting occurred at a maximum temperature of about 2200° F. (about 1200° C.). During the melting process, the $MnO_2$ component of the powder mixture separated and floated to the top of the molten Ni-19Cr-10Si pool to form an upper layer of $MnO_2$. Upon solidification, the Ni-19Cr-10Si metal was substantially free of $MnO_2$.

In view of the above, it can be appreciated that the present invention enables microwave brazing with metallic particles 12 that do not require a melting point suppressant and can be completely melted without the use of a secondary indirect heat source, such as an external SiC susceptor. Whereas conventional metallic powders intended for brazing operations tend to absorb only a limited amount of microwave energy that is insufficient for fully melting the powder particles, particularly if only a small quantity of powder is applied as is the case when repairing a crack in the surface of a turbine nozzle, the improved interaction between microwave radiation 28 and the metallic particles 12 achieved with this invention enables much faster heating of the particles 12 and reduces the amount of power and energy required to perform a brazing operation. The lower power requirement also reduces the risk of arcing in the microwave chamber, which tends to occur as a result of gas ionization when directing a high power microwave field onto a metallic body and results in decoupling and cessation of heating and potentially damage to the component.

While particularly directed to processes that involve joining or repairing superalloys, the present invention is also applicable to other metallic alloy systems. Nonmetallic systems can also be bonded with the metallic particles 12 in the manner described above as long as the nonmetallic substrates being repaired or bonded contain one or more reactive elements, such as titanium, hafnium, zirconium, etc., as is done in conventional active metal brazing (AMB) of ceramic materials. Suitable combined levels of reactive elements in the particles 12 are believed to be up to about 10 weight percent of the particles 12.

While the invention has been described in terms of particular embodiments, it is apparent that other forms could be adopted by one skilled in the art. Accordingly, the scope of the invention is to be limited only by the following claims.

The invention claimed is:

1. An assembly comprising a gas turbine engine component having a substrate and a coating on the substrate, the coating being present on the substrate so as to define an outermost surface of the assembly, the coating comprising a braze material contacting a surface of the substrate, the braze material comprising:
   a first layer contacting the surface of the substrate;
   a second layer entirely separated from the surface of the substrate by the first layer and defining an outermost region of the coating relative to the component;
   a plurality of first particles of a metallic material having a melting point, a first quantity of the first particles being contained in the first layer and a second quantity of the first particles being contained in the second layer; and
   a plurality of second particles contained in the second layer but not in the first layer, the plurality of second particles comprising at least one nonmetallic material chosen from the group consisting of oxides, carbides, and nitrides of at least one metal, the nonmetallic material of the second particles being more susceptible to heating by microwave radiation than the metallic material of the first particles, and the nonmetallic material being present in the braze material in an amount sufficient to enable the first particles to completely melt when the first and second particles are subjected to heating by microwave radiation;
   wherein the outermost region of the coating defined by the second layer is exposed so that the second layer forms an outermost coating surface on the component following exposure thereof to the microwave radiation.

2. The assembly according to claim 1, wherein at least some of the second particles are formed entirely of the nonmetallic material.

3. The assembly according to claim 1, wherein the nonmetallic material of the second particles is present at only an outer surface region of at least some of the second particles and is substantially absent from a core region of the at least some of the second particles.

4. The assembly according to claim 3, wherein the core regions of the at least some of the second particles are formed of a second metallic material and the nonmetallic material is an oxide, carbide, or nitride of the second metallic material.

5. The assembly according to claim 4, wherein the nonmetallic material is formed in situ on the second particles.

6. The assembly according to claim 1, wherein the second particles have a particle size of about −325 mesh.

7. The assembly according to claim 1, wherein the first particles have a particle size of about −325 mesh.

8. The assembly according to claim 1, wherein the second particles constitute up to about 50 weight percent of the first and second particles combined.

9. The assembly according to claim 1, wherein the metallic material of the first particles is a superalloy.

10. The assembly according to claim 1, wherein the nonmetallic material is at least one of nickel oxide and manganese dioxide.

11. An assembly comprising a gas turbine engine component having a substrate and a coating on the substrate, the coating being present on the substrate so as to define an outermost surface of the assembly, the coating comprising a braze material contacting a surface of the substrate, the braze material comprising:
   a first layer contacting the surface of the substrate;
   a second layer entirely separated from the surface of the substrate by the first layer and defining an outermost region of the coating relative to the component;
   a plurality of first particles of a metallic material having a melting point, a first quantity of the first particles being contained in the first layer and a second quantity of the first particles being contained in the second layer; and a plurality of second particles contained in the second layer but not in the first layer, the plurality of second particles comprising at least one nonmetallic material chosen from the group consisting of nickel oxide and manganese dioxide, the nonmetallic material of the second particles being more susceptible to heating by microwave radiation than the metallic material of the first particles, and the nonmetallic material being present in the braze material in an amount sufficient to enable the first particles to completely melt when the first and second particles are subjected to heating by microwave radiation;

wherein the outermost region of the coating defined by the second layer is exposed so that the second layer forms an outermost coating surface on the component following exposure thereof to the microwave radiation.

12. The assembly according to claim 1, wherein the braze material consists essentially of the first and second particles and optionally a binder.

13. The assembly according to claim 1, wherein the second particles within the second layer are formed entirely of the nonmetallic material is present at only outer surface regions of the second particles, the braze material further comprises a third layer that entirely separates the first and second layers, and the third layer does not contain any of the first particles but contains a quantity of third particles that are more susceptible to heating by microwave radiation than the metallic material of the first particles, the nonmetallic material being present at only outer surface regions of the third particles.

* * * * *